Figures 1, 2:
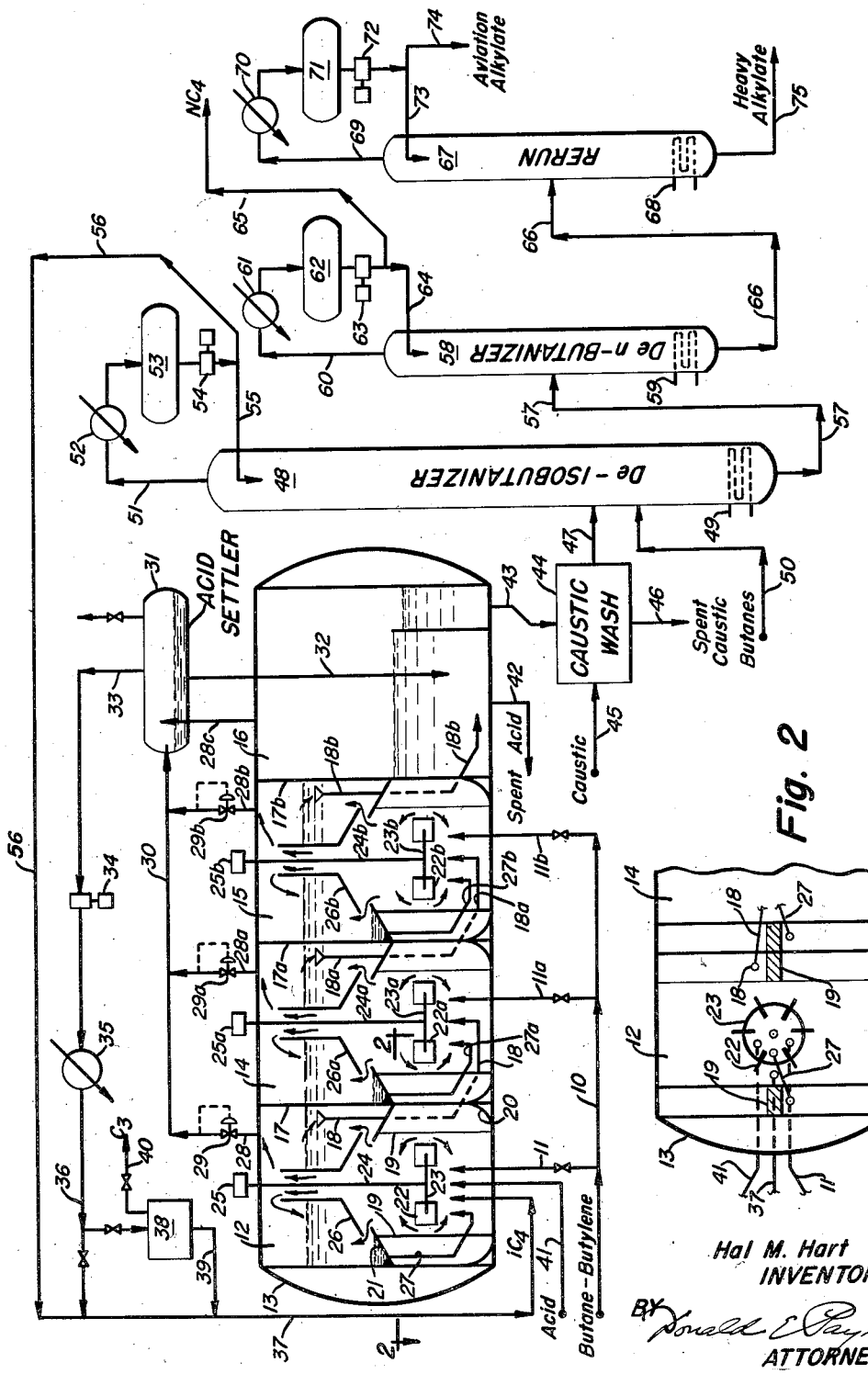

Oct. 30, 1956　　　H. M. HART　　　2,768,987
METHOD AND APPARATUS FOR HYDROCARBON ALKYLATION
Filed Dec. 31, 1954　　　2 Sheets-Sheet 1

Hal M. Hart
INVENTOR
BY Donald E. Payne
ATTORNEY

Oct. 30, 1956   H. M. HART   2,768,987
METHOD AND APPARATUS FOR HYDROCARBON ALKYLATION
Filed Dec. 31, 1954   2 Sheets-Sheet 2

Hal M. Hart
INVENTOR.

BY
Donald E. Payne
ATTORNEY

United States Patent Office 2,768,987
Patented Oct. 30, 1956

2,768,987

METHOD AND APPARATUS FOR HYDROCARBON ALKYLATION

Hal M. Hart, Valparaiso, Ind., assignor to Standard Oil Company, Chicago, Ill., a corporation of Indiana Application December 31, 1954, Serial No. 478,999

7 Claims. (Cl. 260—683.4)

This invention relates to an improved chemical conversion system and it pertains more particularly to an improved reactor system for effecting alkylation of isobutane with normally gaseous olefins such as butenes in the presence of a heavy liquid catalyst such as concentrated sulfuric acid.

During the early years of sulfuric acid alkylation of isobutane with butenes the reactors were of the so-called jet emulsion recycle type wherein an acid-hydrocarbon mixture was recirculated through a reaction zone by a pump and flow rates were employed such that a so-called internal isobutane to olefin ratio of the order of 100:1 was maintained. Performance of this type of reactor was quite good in terms of alkylate yield and quality but there were at least two high cost factors involved in the operation: (1) the power requirements for the emulsion recycle were high and (2) a large investment was required for the plant and particularly for the isobutane fractionator in order to supply the required 5 parts of isobutane recycle for each part of fresh olefin feed. More recently, a so-called "cascade" type of reactor was developed (note U. S. 2,429,205) in an effort to minimize these two cost factors. As commercially developed, the cascade type reactors employed pumps for recirculating the contents of each mixing zone into which the olefin was introduced. However, the cascade systems heretofore known to the art have given rise to a new problem of converting excessive amounts of the charging stock into "heavy alkylate," i. e. to alkylate boiling above the range desired for aviation gasoline. An object of my invention is to provide an improved cascade type alkylation reactor system which will retain and even improve the low cost advantages of the cascade system and, at the same time, minimize production of heavy alkylate, i. e. reduce the amount of heavy alkylate produced from 10 to 20 percent or more to less than 5 percent and preferably less than 2 percent. A further object is to provide a system which will produce more alkylate per gallon of acid which will produce alkylate of higher octane number, and which will require a lower external isobutane to olefin ratio than has heretofore been necessary. Basically, my object is to provide an improved reactor system for effecting conversion of a first reactant with a second reactant in the presence of a heavy liquid and a refrigerant, which system can be installed and operated at minimum expense but which system will retain all of the operating advantages of more expensive systems heretofore known in the art.

In practicing my invention I employ a long horizontal cylindrical vessel which is separated by vertical baffles into a plurality of mixing compartments and a settling compartment, each mixing compartment being provided with a settling zone in the upper part thereof so that a substantial amount of the heavy sulfuric acid liquid may be returned from the settling zone to the mixing zone in each mixing compartment. I prefer to employ a baffle in each mixing compartment between the mixing zone and the settling zone so that the emulsion in the latter may be relatively quiescent. The mixing is effected by a turbo-impeller mixer in the lower part of each mixing compartment, said mixer having spaced vertical blades peripherally mounted on a horizontal circular plate carried by a vertical shaft which is driven at the rate of about 40 to 400 R. P. M. The turbo-impeller mixer is designed to intimately mix and emulsify the acid with reactants in refrigerant and to impel said mixture against the peripheral walls of the mixing compartment for obtaining a rapidly moving emulsion circulation which is toward the peripheral walls opposite the impeller blades and toward the shaft above and below the impeller blades. At least one, and preferably two or more, vertical baffles are provided in each mixing compartment to prevent swirling of the emulsion and to improve mixing efficiency.

The baffle between the mixing and settling zones in each mixing compartment may be an inclined plate or it may be funnel shaped or of the screen type and its function is to effect separation of vaporized refrigerant from the liquid and to provide a quiescent zone wherein most of the acid phase can settle and be returned to the mixing zone while the lighter liquid phase is transferred from the upper part of the settling zone to the mixing zone in the succeeding compartment. In order to effect flow of light liquid from one compartment to the next, the pressure in the initial compartment may be sufficiently higher than the pressure in the succeeding compartment to overcome the density effect (the light liquid being of substantially lower density than the acid or emulsion); the required pressure differential may be maintained by valves in conduits from which refrigerant vapors are withdrawn from each compartment. Alternatively the flow may be effected by turbo impeller action of the mixer, using the vortex produced thereby for drawing fluids into the circulating stream and using the force of the impeller for positively driving emulsion from the mixing zone to the settling zone. The withdrawn refrigerant vapors are condensed and preferably all returned to the first compartment. By operating in this manner the acid may be about 95 to 99 percent strength in the first compartment, 93 to 97 percent in the second zone and 88 to 92 percent in the third zone so that the final acid withdrawn from the settling zone is the most nearly spent acid and no recycle of acid is necessary.

In order to insure return of acid from the settling zone to the mixing zone in each mixing compartment, I prefer to provide a conduit from the base of the settling zone to a point near the shaft of the turbo-impeller mixer. The mixing zone may be provided with rounded surfaces at its upper and lower peripheral walls since it is desired to avoid any stagnant areas and to insure that the sulfuric acid and reactants are in intimate contact at the desired temperature throughout the conversion. The rapidly circulating emulsion in each mixing zone gives the effect of a very high internal isobutane to olefin ratio which may be of the order of 200 to 500 or even higher. At the same time, the power required for operating the turbo-impeller is much less than required by pumps or mixers heretofore employed for this purpose.

Figure 3:
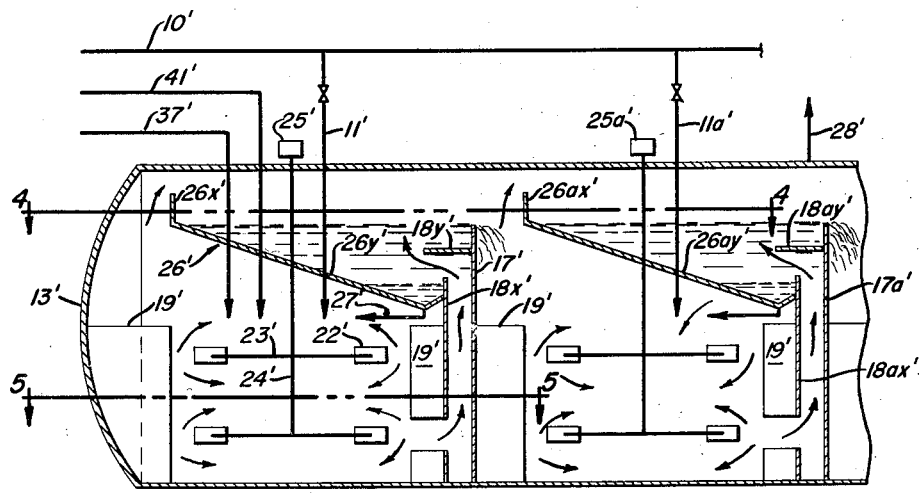
Figure 4:
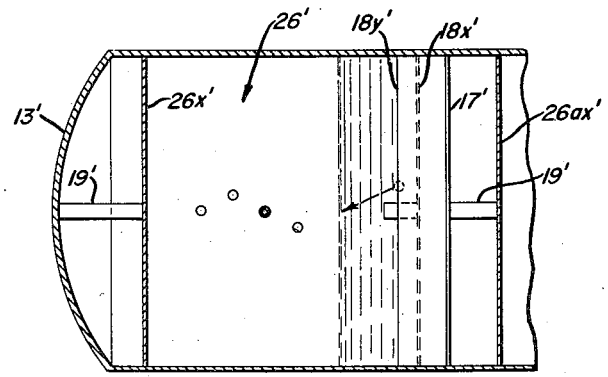
Figure 5:
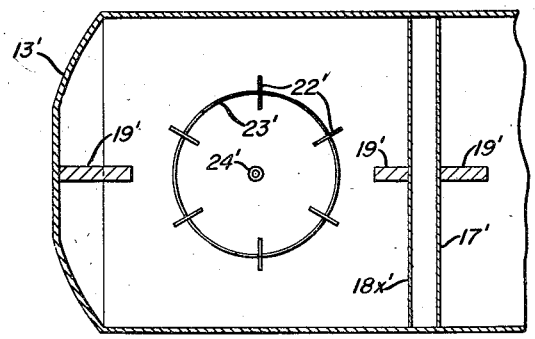

The invention will be more clearly understood from the following description of a specific example read in conjunction with the accompanying drawings in which:

Figure 1 is a schematic flow diagram of a commercial alkylation system for producing about 800 to 1,000 barrels per day of aviation alkylate, Figure 2 is a detailed horizontal section taken along the lines of 2—2 of Figure 1, Figure 3 is a schematic flow diagram of another modification whereing all of the compartments are under the same pressure, Figure 4 is a section taken along lines 4—4 of Figure 3, and Figure 5 is a section taken along lines 5—5 of Figure 3.

While the examples illustrate the application of my invention to sulfuric acid alkylation, it should be understood that the invention may also be applicable to other chemical conversion processes.

In this example the charging stock introduced by line 10 is a butane-butylene refinery stream containing on a mol percent basis about:

35% isobutane
25% isobutylene
23% normal butane
15% normal butenes
2% lighter and heavier hydrocarbons said stream being introduced at the rate of about 1,500 barrels per day. About one-third of the incoming charge is introduced by line 11 at the base of compartment 12 of long horizontal reactor 13. Another third is introduced by line 11a into the base of compartment 14 and the remaining third is introduced by line 11b into the base of compartment 15, compartment 16 of the reaction vessel being a settling section. The reactor is divided into the separate compartments by vertical partitions 17, 17a and 17b which effectively partition the reactor into separate zones and which extend from side to side and from top to bottom. To the left of each partition 17 is a conduit 18 which extends through its respective partition and discharges near the bottom of the center of the following compartment. Vertical anti-swirl baffles 19 are mounted at the sides of the mixing zone in each mixing compartment. I prefer to employ rounded annular baffles or fill material 20 at the lower periphery of each mixing compartment and inclined or curved annular baffles 21 at the upper part of each mixing zone so that the circulation of emulsion formed by the mixer will be in the direction shown by the arrows, i. e. toward the peripheral walls opposite the turbo-impeller mixer and toward the shaft above and below the mixer blades.

The turbo-impeller mixer in this case, where the reactor is about 10 feet in diameter and about 30 feet long and the partitions 17, 17a and 17b are about 5 or 6 feet apart, consists of vertical flat rectangular plates 22 about 3 to 9 inches wide and 3 to 12 inches long, e. g. about 5 inches by 8 inches radially mounted on flat horizontal plate 23 and spaced at angles of about 45° so that the distance from outer tips of plates on any diameter is about 30 to 40 inches, the horizontal plate being mounted on shaft 24 which is driven by motor 25 at the rate of about 40 to 400, e. g. about 150 R. P. M. No novelty is claimed in the turbo-impeller mixer per se since such mixers have been employed in other conversion systems as described, for example, in U. S. 2,677,000.

Vapors are liberated by the exothermic alkylation reaction and I prefer to employ a baffle 26 for facilitating the separation of such vapors from the reactant emulsion. Baffle 26 may be simply an inclined flat metal plate or it may be in the form of a screen but I prefer to employ a funnel-shaped baffle, the lower and wider end of which overlaps baffles 21 so that the ascending vapors are funneled upwardly toward the top of the reactor while the emulsion flows between baffles 21 and 26 to the upper relatively quiescent settling zone. An additional annular screen baffle may be employed at the upper end of baffle 26 to break any foam which may be encountered. A conduit 27 is preferably employed for returning to the lower center portion of each mixing compartment, the acid which settles from the emulsion in the upper settling zone.

Refrigerant vapors from compartment 12 are withdrawn through pipe 28 containing valve 29 which is set to maintain the pressure in compartment 12 high enough to cause the flow of light liquid through conduit 18 into compartment 14. Similarly, control of valve 29a in line 28a maintains the pressure in compartment 14 high enough to cause light liquid to flow through conduit 18a to the lower part of compartment 15. Refrigerant vapors withdrawn through lines 28a and 28b are introduced by manifold 30 to acid settler 31, vapors from the settling compartment being vented to the settler directly through line 28c or via manifold 30. Settled acid is returned by line 32 to the lower part of the settling compartment. Refrigerant vapors are withdrawn through line 33, compressed by compressor 34, condensed in cooler 35 and either returned directly by lines 36 and 37 through the lower part of the first mixing compartment 12 or passed through a separation zone 38 from which condensate is returned by line 39 and from which any propane may be vented by line 40.

Referring now to the mode of operation in my improved system, about 500 barrels per day of the butane-butylene charge is introduced by line 11, about 4,000 to 5,000, e. g. 4,500, barrels per day of isobutane is introduced through line 37 and the required amount of concentrated, e. g. 98 percent, sulfuric acid is introduced by line 41 below plate 23 in compartment 12 together with recycled acid phase which is introduced through line 27. The amount of acid will be somewhat less than that heretofore required in alkylation processes of this type but may be of the order of .4 to 1 pound per gallon of total alkylate produced. The alkylation is preferably effected at a temperature of about 35° F. and at a pressure of about 2 to 10, e. g. 5, p. s. i. g. but the temperature and the pressure in the first stage will be somewhat higher than that in the second and that of the second will be somewhat higher than that of the third because of the slight difference in pressure, the refrigeration being effected by vaporization of the refrigerant butanes. The speed of the turbo-impeller mixer should be controlled in each instance to give the desired emulsification and intimate contact but should not be sufficiently high to produce undue amounts of foam, the mixer speed preferably being in the range of about 50 to 150 R. P. M. At such speeds there will be a rapid circulatory motion of the produced emulsion thus giving the effect of a very high internal isobutane to olefin ratio. The liberated butane vapors will be deflected by baffles 21 and/or 26 toward the top of the reaction vessel and, as above stated, screen-type baffles or other means may be employed to break any foam and separate any liquid which emerges from the top of the funnel-shaped baffle.

In the space between the baffle 26 and the lateral compartment walls a relatively quiescent settling zone is maintained so that most of the acid in the emulsion may be settled therefrom and returned to the mixing zone through conduit 27. The amount of acid thus returned may be controlled in part by controlling the speed of the turbo-impeller mixer although other known regulatory means may be employed. The lighter upper layer from the settling zone which contains some of the acid is introduced by line 18 to compartment 14 where an additional 500 barrels per day of the butane-butylene charge is introduced through line 11a. Here again, acid is recycled within the zone by conduit 27a and it is preferred to operate with substantially the same acid to hydrocarbon ratio in each of the compartments. The hydrocarbon phase from which a substantial portion of the acid has been settled is withdrawn from the settling zone of compartment 14 through conduit 18a to the base of compartment 15 where the final amount of charging stock is introduced. The final effluent withdrawn from the upper part of the settling zone in compartment 15 carries with it acid at substantially the same rate as fresh acid is introduced through line 41 but the final acid may be at a concentration of about 88 to 92 percent so that, in preferred operations, none of this acid is recycled. The spent acid is separated from the diluted alkylate in compartment 16, the spent acid being withdrawn through line 42 and the alkylate overflowing the wier in the settling zone and then being withdrawn through line 43 to a conventional caustic wash system 44 into which caustic is introduced by line 45 and spent caustic is withdrawn by line 46.

The caustic washed alkylate is introduced by line 47 to deisobutanizer tower 48 which is provided with a suitable reboiler 49. Extraneous butanes may be introduced into tower 48 through line 50 in amounts of about 800 to 1,000 barrels per day to provide the required amount of isobutane for the system. Isobutane is withdrawn overhead through line 51 and condenser 52 to receiver 53 from which a part of it is returned by pump 54 and line 55 to serve as reflux and the remainder is passed by lines 56 and 37 to the first mixing compartment of the reactor.

The bottoms from tower 48 are introduced by line 57 into debutanizer 58 which is provided with reboiler 59. Normal butanes are taken overhead through line 60, condensed in cooler 61 and introduced into receiver 62 from which a part are returned by pump 63 to line 64 for reflux and the net production of normal butanes is removed by line 65.

The bottoms from debutanizer 58 are introduced by line 66 into fractionator 67 which is provided with reboiler 68. The aviation alkylate is taken overhead through line 69 and condenser 70 to receiver 71, a part of the condensate being returned by pump 72 and line 73 to serve as reflux and the net aviation alkylate being withdrawn through line 74. Heavy alkylate is withdrawn from the base of fractionator 67 through line 75. It should be understood that the fractionation system is schematic and that any conventional fractionation system may be employed. If the charge contains any appreciable amount of $C_3$ hydrocarbons, it may be necessary to provide a depropanizer for removing propane from isobutane recycled by line 56 and/or to provide more effective means for removing propane from separator 38.

In the foregoing example a higher external isobutane to olefin charge rate was employed than is really necessary in the practice of my invention since the more effective contacting makes it possible to employ external isobutane ratios as low as 3 or even lower. It should also be emphasized that less acid is required because of more effective acid utilization and that in addition to minimizing production of heavy alkylate, the aviation alkylate actually produced is of higher octane number than alkylate obtained in previous cascade type units.

In the embodiment shown in Figures 3, 4 and 5, each of the separate compartments is maintained at the same pressure since in this case partitions 17' do not extend to the top of the reactor but serve as an overflow wier. In this embodiment two turbo impeller assemblies are mounted on shafts 24', 24a', etc., one being near the upper part of the mixing zone and the other near the base thereof in each compartment. The incoming acid, isobutane and olefin charge are preferably introduced through lines 41', 37' and 10' in the vortex zone above the plate supporting the upper impeller blades along with settled and recycled acid which is likewise introduced at this point through line 27'. Anti-swirl baffles 19' serve the same function as in the previous embodiment.

In the embodiment of Figures 3, 4 and 5, the baffle 26' which is employed for maintaining the relatively quiescent settling zone is formed by a vertical plate 26x' extending from side to side but spaced from the top of the reactor and an inclined portion 26y' which extends to a point near the upper part of transverse baffle 18x' which likewise extends from side to side but is either spaced from the bottom or provided with an opening adjacent its base, the space between baffle 18x' and 17' forming a vertical conduit through which a portion of the emulsion in the mixing zone is impelled by the lower turbo-impeller blades up to the settling zone above the inclined portion 26y' of baffle 26'. A horizontal baffle 18y' may be mounted near the top of partition 17' in order to deflect the upflowing emulsion stream to the quiescent settling zone. The acid-rich heavier liquid is returned from the base of the settling zone through line 27' to the mixing zone while the lighter isobutane alkylate phase containing a portion of the acid flows over partition 17' into the subsequent mixing zone. The vertically extending portion 26ax' of baffle 26a' extends sufficiently close to the upper part of reactor 13' to prevent the light phase from flowing directly into the settling zone of the second compartment. Although the light liquid flowing downwardly through the space between partition 17' and baffle 26ax' (which corresponds to conduit 18 in Figure 1) is lighter than the acid emulsion in the second mixing zone, this lighter liquid is drawn into the upper vortex of the second mixing zone by the action of the upper turbo-impeller mixer and is also drawn into the mixing zone by the action of the lower turbo-impeller which discharges emulsion from the base of the second mixing zone to the relatively quiescent settling section thereof.

Baffle 26' serves the function of deflecting most of the gases liberated from the mixing zone to the upper part of the reactor without disturbing the relatively quiescent settling zone. It also serves as a deflector for introducing light liquid from the preceding zone into the mixing zone of the next compartment and it serves as an inclined base for the settling zone in each section.

From the foregoing description, it will be seen that the modification described in Figures 3 to 5 does not require that the various compartments be maintained at different pressures since it employs the vortex-producing and impelling action of the turbo-impeller mixers for positively controlling flow through the unit instead of employing pressure differentials between sealed compartments.

Although the specific examples of my invention have been described in considerable detail, it should be understood that other modifications and alternative arrangements and conditions will be apparent from the above description to those skilled in the art.

I claim:

1. A reactor apparatus comprising a long horizontal cylindrical vessel, vertical partitions separating said vessel into a plurality of mixing compartments and a settling compartment, a settling zone in the upper part of each mixing compartment, a conduit for passing an upper liquid phase from each mixing zone to the lower part of the succeeding compartment, at least one conduit for removing vapors from the top of the reactor, a refrigeration system for condensing vapors withdrawn through said conduit and for returning at least part of the condensed vapors to the first mixing compartment, connections for introducing a heavy liquid, a refrigerant, a first reactant and a second reactant into the first mixing compartment and for introducing second reactant into at least one succeeding mixing compartment, vertical anti-swirl baffles in said mixing compartments, turbo-impeller mixers in the lower part of the mixing compartments, each mixer comprising spaced vertical blades peripherally mounted on a horizontal circular plate carried by a vertical shaft and designed to intimately mix immiscible fluids and to impel said mixture against the peripheral walls of the mixing compartment for obtaining a rapidly moving emulsion circulation which is toward the peripheral walls opposite the impeller blades and toward the shaft above and below the impeller blades, motors for driving each shaft at a speed in the range of about 40 to 400 R. P. M., and a baffle between the mixing zone in each mixing compartment and the upper settling zone therein whereby mixed fluids in the upper part of each mixing compartment are relatively quiescent so that a substantial part of the heavier liquid may settle from the settling zone back to the mixing zone.

2. The apparatus of claim 1 wherein said partitions seal compartments from each other and which includes valved conduits for removing vapors from the top of each compartment whereby a pressure drop may be maintained between succeeding compartments by controlling the amount of vapors withdrawn through said valved conduits.

3. The apparatus of claim 1 which includes a conduit opening adjacent the periphery of an impeller in at least one of the compartments whereby the impeller discharges liquid through said conduit to the settling zone in said compartment.

4. The method of alkylating isobutane with butenes by contact with concentrated sulfuric acid under alkylation conditions, which method comprises introducing isobutane, butenes and concentrated sulfuric acid at the base of a first mixing compartment containing a settling zone in the upper part thereof, emulsifying the hydrocarbons with the sulfuric acid and obtaining intimate contact therebetween by rapidly impelling the mixture toward the periphery of the mixing compartment while preventing swirling motion in said compartment whereby the emulsion is rapidly circulated by the impelling step to the periphery and thence toward the center of the mixing compartment to obtain a high internal isobutane to olefin ratio, withdrawing liberated butane vapors at substantially constant pressure to maintain constant alkylation temperature, maintaining a relatively quiescent settling zone in the upper part of the mixing compartment, returning an acid phase from the settling zone to the circulating emulsion stream in the mixing zone and introducing acid-depleted emulsion from the upper part of the settling zone to the lower part of a succeeding mixing compartment.

5. The method of claim 4 which includes the step of maintaining the pressure in the succeeding compartment lower than the pressure in the initial compartment.

6. The method of claim 4 wherein the impelling of the mixture provides at least a part of the pressure for discharging liquids from the mixing zone to the next succeeding zone.

7. The method of alkylating isobutane with an olefin stream which comprises introducing into a first mixing zone a cooled isobutane stream, an acid stream, an olefin stream and a recycled emulsion stream, emulsifying and intimately contacting said streams by rapidly impelling all of the introduced liquids toward the lateral walls of the first mixing zone while baffling the swirling motion of the liquids at the peripheral walls, the impelling of the liquids being effected by rotating at about 50 to 150 R. P. M., a substantially horizontal plate having spaced, vertical plates mounted at spaced points around the periphery thereof, discharging emulsion from the first mixing zone to a first relatively quiescent settling zone, withdrawing vaporized isobutane, returning heavy emulsion from the settling zone to form the emulsion stream introduced into the first mixing zone, introducing light emulsion from the settling zone together with a second recycled emulsion and an additional olefin stream into a second mixing zone, rapidly impelling the introduced liquids in the second mixing zone toward the lateral peripheral walls thereof while baffling the swirling motion adjacent the peripheral walls thereof, the impelling in the second zone being obtained as hereinabove defined, discharging emulsion from the second mixing zone to a second relatively quiescent settling zone, removing vaporized isobutane, returning heavy emulsion from the second settling zone for return as said second recycled emulsion to the second mixing zone, employing at least one additional mixing and settling with added olefin in substantially the same manner and finally separating spent acid from alkylate formed in the contacting steps.

References Cited in the file of this patent

UNITED STATES PATENTS

| | | |
|---|---|---|
| 1,861,163 | Ray et al. | May 31, 1932 |
| 2,084,342 | Houghton | June 22, 1937 |
| 2,171,250 | Archibald | Aug. 29, 1939 |
| 2,311,144 | Wickham et al. | Feb. 16, 1943 |
| 2,366,627 | Kemp | Jan. 2, 1945 |
| 2,429,205 | Jenney et al. | Oct. 21, 1947 |
| 2,677,000 | Russum | Apr. 27, 1954 |